March 17, 1959  T. F. CARMICHAEL  2,878,404
ELECTROMAGNETIC DEVICE
Filed April 1, 1957  2 Sheets-Sheet 1

INVENTOR.
Thomas Frazer Carmichael.
BY
Harness, Dickey & Pierce.
ATTORNEYS.

March 17, 1959 T. F. CARMICHAEL 2,878,404
ELECTROMAGNETIC DEVICE
Filed April 1, 1957 2 Sheets-Sheet 2
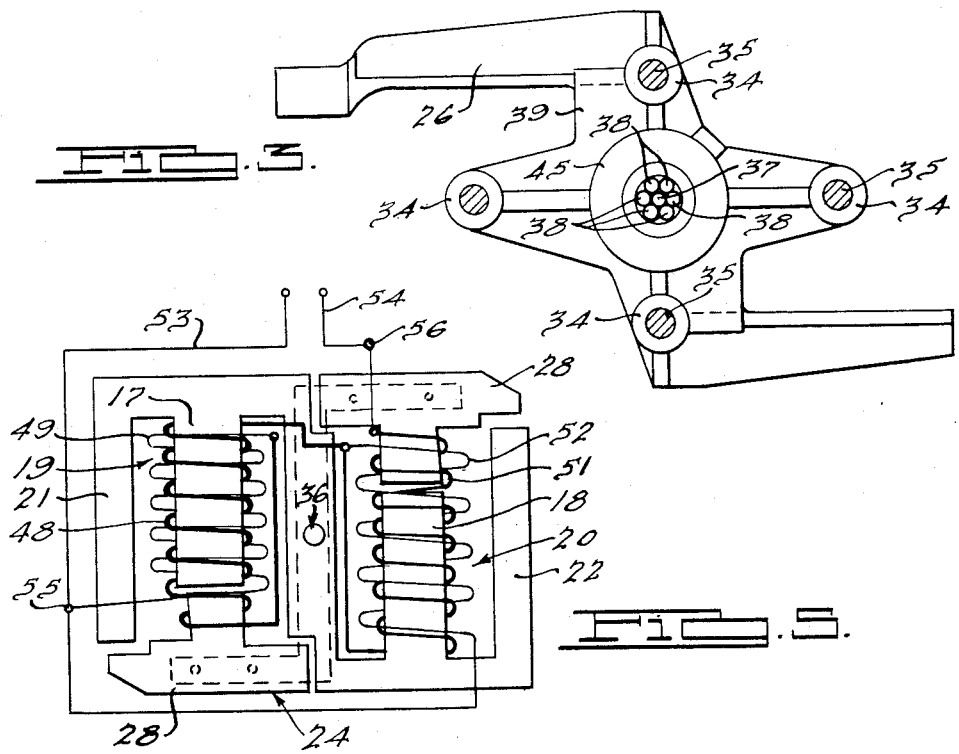
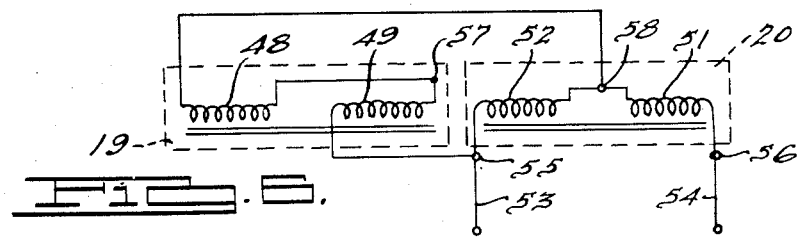
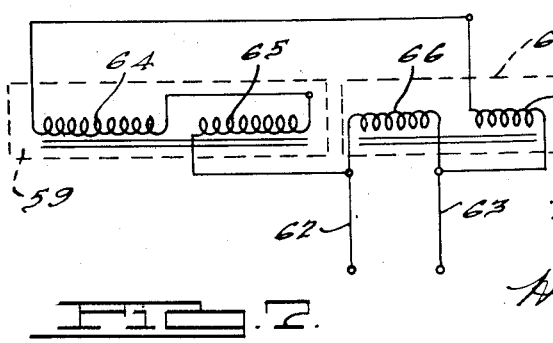
INVENTOR.
Thomas Frazer Carmichael.
BY
Harness, Dickey & Pierce.
ATTORNEYS.

United States Patent Office 2,878,404
Patented Mar. 17, 1959

2,878,404
ELECTROMAGNETIC DEVICE

Thomas F. Carmichael, Plymouth, Mich., assignor to Syncro Corporation, Oxford, Mich., a corporation of Michigan Application April 1, 1957, Serial No. 649,715

17 Claims. (Cl. 310—38)

This invention relates to electromagnetic reciprocating motors, and more particularly to motors intended for use with power tools such as sanders, honers, jigsaws and the like.

It is an object of the invention to provide a novel and improved electromagnetic reciprocating motor which has greatly enhanced electrical and power characteristics, improved efficiency and ability to maintain armature stroke under heavy loads.

It is another object to provide an improved motor of this character which is of relatively simple and economical construction, and affords substantial savings in material.

Other objects, features and advantages of the present invention will become apparent from the subsequent description, taken in conjunction with the accompanying drawings.

In the drawings:

Figure 3 is a bottom plan view of one of the armature brackets showing the positions of the platen-attaching bolts;

Figure 5 is a partially schematic view showing the manner in which the coils are wound on the core;

Figure 6 is a circuit diagram showing a preferred arrangement of the coils in the electromagnetic motor; and Figure 7 is a circuit diagram of a modified arrangement in which the coils of one coil assembly are in parallel relation.

Figure 1:
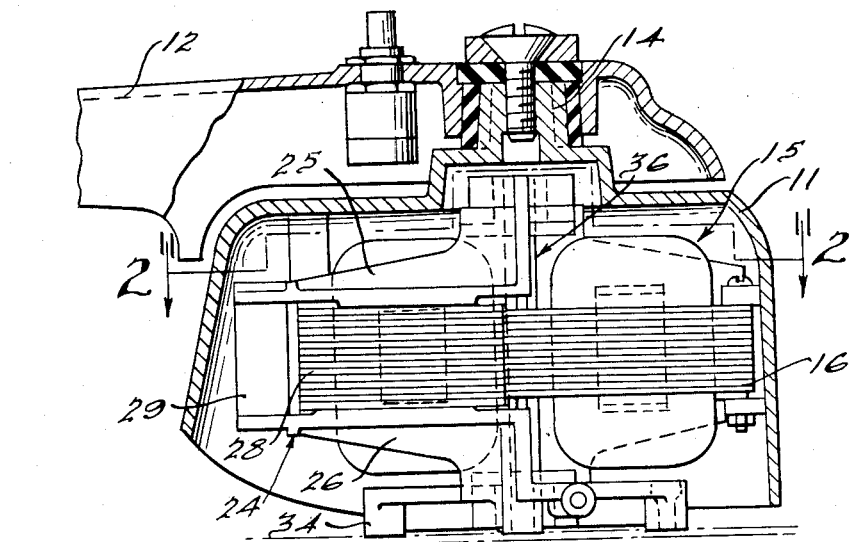
Figure 1 is a side elevational view in cross section of a sander having an electromagnetic reciprocating motor which incorporates the principles of this invention.

In general terms, the illustrated embodiment of the invention comprises an electromagnetic reciprocating motor having two oppositely disposed U-shaped core sections with a common leg and core extensions in each U-shaped section. Two coil assemblies are mounted on the extensions, and a Z-shaped armature having separate portions for the two core sections is centrally pivoted to the core and has plungers extending into said coil assemblies. Each coil assembly comprises an inner and an outer coil or winding, and the connections are such that one coil assembly, the windings of which are in series opposed relation, is in parallel with one winding and in series with the other winding of the other coil assembly across a source of alternating current. In one embodiment, line voltage is connected across both coils of said other coil assembly, these coils being wound in series aiding relation so that both coils induce flux in the same direction. In a modified form of the invention, the coils of said other coil assembly are connected in parallel across the line.

The polyphase flux effect and autotransformer action of this construction and circuit arrangement will serve to impart greatly increased power to a tool such as a reciprocating sander attached to the armature and will greatly improve the economy of construction and operation of the motor.

The invention is shown in the illustrated embodiment as being incorporated in a portable sander of the electromagnetic reciprocating type, having a housing 11 which encloses the motor and a handle 12 for guiding the tool. Housing 11 has a shell-like configuration with an open bottom below which is disposed a sandpaper platen 13. The upper end of housing 11 has a post 14 formed thereon to which handle 12 is secured, the handle extending to one side of the housing, and a switch is provided on handle 12 for controlling energization of the tool motor.

The motor is generally indicated at 15 and is disposed within housing 11. In the present embodiment, the motor includes a laminated core 16 made up of two U-shaped portions facing in opposite directions and having a common leg. Within the two U-shaped portions of the core are core projections 17 and 18 respectively upon which are mounted coil assemblies generally indicated at 19 and 20. The outer legs 21 and 22 of the U-shaped portions of the core are secured to housing 11 by means of bolts 23 so that the assembly of core and coils is fixed within the housing.

The armature is generally indicated at 24 and is approximately Z-shaped, its configuration being most clearly discernible in Figure 3. The armature comprises upper and lower Z-shaped brackets 25 and 26 respectively, the central legs of the brackets being disposed on opposite sides of central leg 27 of core 16 and spaced therefrom. Between the outer legs of brackets 25 and 26 are secured two sets of T-shaped laminations 28, these laminations being disposed adjacent the oppositely facing pole faces of core 16. A spring abutment member 29 is secured to one end of armature 24 between brackets 25 and 26, this abutment being engageable on opposite sides by springs 30 and 31 respectively. Both springs are of the helical compression type and serve to maintain armature 24 in a neutral position slightly spaced from the pole faces of core 16, aiding the vibrational movement of the armature when attracted by the pulsating flux. The outer end of spring 30 rests against an adjustable screw 32 in housing 11 by means of which the spring forces may be varied, while spring 31 is provided with a housing abutment 33 for supporting its outer end. Bracket 26, disposed below core 16, is provided with a plurality of bosses 34 by means of which bolts 35 secure the armature assembly to platen 13.

Armature 24 is supported for pivotal movement on a vertical axis, so that movement of the sandpaper platen will consist of rapid oscillations in a horizontal plane about the axis of the armature support. The support, generally indicated at 36, comprises a bundle of rods so connected to the core and armature as to provide a torsional bearing support for the armature. The construction of the armature support is described in detail in copending application Serial No. 578,682, filed April 17, 1956, by the present applicant. The support comprises a central rod 37 surrounded by six rods 38, all rods being of equal length. The rods are fabricated of an appropriate metal having spring-like qualities and together form a compact circular bundle.

The bundle of rods comprising armature support 36 are so mounted as to provide a double torsional connection between the central leg 27 of core 16 and the central legs 39 of upper and lower armature brackets 25 and 26. In particular, the intermediate portion 41 of bundle 36 is press-fitted into a circular aperture 42 extending through the central portion of core leg 27, while the outer ends 43 and 44 of the bundle are press-fitted to brackets 25 and 26 respectively. For this purpose, central legs 39 of the brackets are provided with central bosses 45 holding hardened bushings 46, the latter having bores tapered at one end 47 to facilitate the introduction of the bundle ends. One end of bore 42 in the core may also be tapered for assembly purposes.

Figure 2:
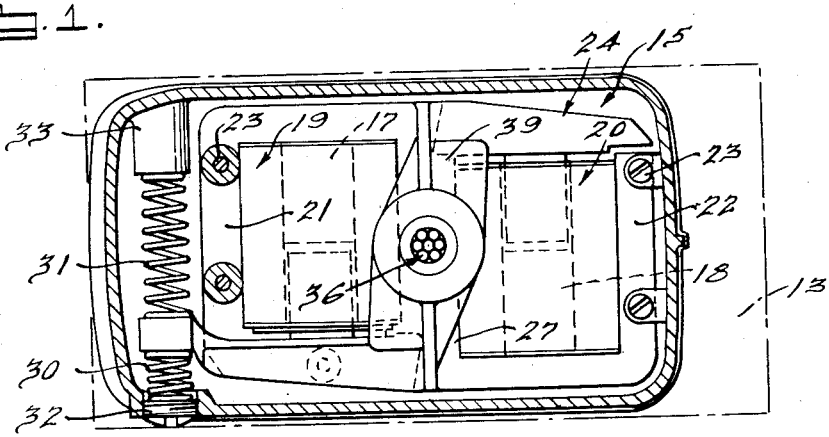
Figure 2 is a plan view in cross section taken along the line 2—2 of Figure 1 and showing the configuration of the armature supporting elements.
Figure 4:
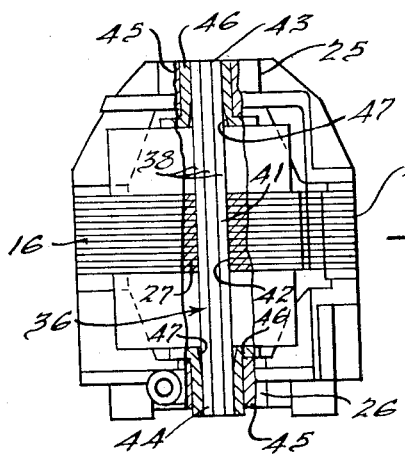
Figure 4 is an end elevational view of the core and armature assembly with parts broken away, showing the configuration of the armature brackets and the manner in which the armature support is held in position.

The novel construction of armature 24 is best seen in Figures 1–4. As mentioned previously, the central legs 39 of Z-shaped brackets 25 and 26 are disposed above and below central leg 27 of core 16 and are spaced therefrom. Brackets 25 and 26 are preferably constructed of a non-magnetizable material such as die-cast aluminum, so that the magnetic flux induced in T-shaped laminations 28 will not be carried by these brackets, thus substantially reducing flux leakage between the two sets of laminations. The fact that the magnetic portions of the armature assembly are located at the extremities of this assembly will also enhance the inertial properties of the device, since the main masses to be moved will be those most closely adjacent the electromagnet core.

The invention includes a novel and improved circuit arrangement for coil assemblies 19 and 20, this arrangement being best shown in Figures 5 and 6. Coil assembly 19, which is mounted on core extension 17, comprises an inner coil 48 and an outer coil 49, while coil assembly 20, mounted on core extension 18, includes an inner coil 51 and an outer coil 52. Coils 51 and 52 are connected across supply lines 53 and 54 which are adapted to be connected to a source of alternating current, coil 52 being connected to supply line 53 at junction 55 while coil 51 is connected to supply line 54 at junction 56. Coils 51 and 52 are wound in series aiding relation, that is, they are so connected and wound as to induce flux in the same direction in core extension 18 and T-shaped laminations 28 of the armature.

One end of coil 49 is connected to supply line 53 at junction 55 and the other end to coil 48 through a junction 57. The other end of coil 48 is connected to a center tap 58 between coils 51 and 52. Coils 48 and 49 are connected and wound in series opposed relation, that is, at any one time the flux induced by the current in these two coils will be in opposite directions within core extension 17 and the adjacent T-shaped laminations 28 of armature 24.

It will be noted from an examination of Figures 5 and 6 that the two pairs of coils 19 and 20 have isolated magnetic circuits with substantially no mutual inductance between the two pairs of coils. The construction of armature 24 is such that the flux induced in the two sets of laminations 28 will have no mutual flux path due to the presence of non-magnetic brackets 25 and 26.

The operation of the electromagnetic tool thus far described will be apparent from the foregoing description. Upon the application of alternating supply current to motor 15 through closure of the switch on handle 12, armature 24 and attached sandpaper platen 13 will reciprocate about pivotal support 36 as flux changes occur in the two magnetic circuits of coil assemblies 19 and 20. The double torsional effect of pivotal support 36, as well as the effect of springs 31 and 30 acting on armature 24, will contribute to the forces acting on the sandpaper platen.

The electrical connections are such that during operation, coil assembly 19 will act as an inductive load across coil 52 of coil assembly 20, thus creating a phase shift between the magnetizing currents in coils 51 and 52. Since the mutual inductance between the coil pairs of each coil assembly will be varied by reciprocation of T-shaped armature laminations 28, a further polyphase flux effect will be created in both sections of the core. It should also be noted that the two coils 51 and 52 in coil assembly 20 will have an action similar to that of a step-down auto-transformer, with coil assembly 19 acting as the load, and the current in coil 52 will thus be reduced.

In practice, it has been found that an electromagnetic reciprocating motor constructed in accordance with the above-described principles exhibits substantial advantages, from both the manufacturing and operational standpoints, over previously known types of motors. For a given rated performance a sander having the novel and improved motor utilizes greatly reduced wattage and has lower core losses. Consequently, considerably less copper is needed in the windings, the saving in copper at times exceeding 40% by weight over conventional types of motors. This will permit lower heating losses, a higher power factor and an increase in efficiency. Because of the polyphase flux effect described above, the time in each cycle during which maximum forces are acting to propel the armature will be increased. At the same time this phase displacement is insufficient to cause the forces acting on the armature to counteract each other in such a way as to lessen the armature stroke.

An example of a suitable electromagnetic motor which was constructed in accordance with the principles of the invention and operated as a part of a sander will now be given. The overall dimensions of the motor were approximately 4" in length and 2½" in width, with a core thickness of about ⅝". Core extensions 17 and 18 had a width of approximately 9/16". The coils were wound as follows:

Coil 48—1,040 turns of #24 wire.
Coil 49—221 turns of #24 wire.
Coil 51—876 turns of #24 wire.
Coil 52—408 turns of #26 wire.

When the sander containing this motor was operated, the following was noted:

Input voltage=120 volts.
Input current=0.98 amp.
Input power=27 watts.
Current in coil assembly 19 (coils 48 and 49)=0.5 amp.
Current in coil 52=0.46 amp.
Voltage of coil 48=50 volts.
Voltage of coil 49=10 volts.
Voltage of coil 51=41 volts.
Voltage of coil 52=85 volts.
Stroke of sander platen=9/64".
Power factor=23%.

When the sander was subjected to operational tests, it exhibited characteristics under load which were the equivalent of conventional sanders drawing about twice as much power and with approximately double the weight of copper in the coil turns.

A temperature test was conducted by energizing the motor for five minutes and then de-energizing it for three minutes in successive cycles. The initial temperature of the motor was 22° C. which was room temperature. After approximately 1½ hours of this test, the temperature of coil assembly 19 had risen 48° C. while the temperature of coil assembly 20 had risen 39° C. The input voltage and current remained at 120 volts and 0.98 amp. respectively.

Figure 7 illustrates a modified form of the improved motor which incorporates the same principles of construction but in which the coils of one coil assembly are connected in parallel across the supply conduits. More particularly, the motor comprises coil assemblies 59 and 61 which are positioned similarly to coil assemblies 19 and 20 respectively of the previous embodiment. A pair of supply conduits 62 and 63 are connected across coil 66, and conduit 63 is connected in series with coil 67. Coils 64 and 65, which are in series opposed relation, are connected in series with coil 67 and supply conduit 62. Coils 66 and 67 of coil assembly 61 are connected in magnetically aiding relation, like coils 51 and 52 of the previous embodiment. The magnetic circuits of coil assemblies 59 and 61 are isolated from each other. It has been found that an electric motor constructed in accordance with Figure 7 has substantial advantages in construction and operation which are analogous to those described with respect to the first embodiment.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims. Thus, it will be appreciated that the coils in each coil assembly could be disposed in tandem relation or other than coaxially within the principles of the invention. Moreover, in some cases coil assembly 19 (or assembly 59 in the embodiment of Figure 7) could be composed of a single coil rather than of two windings as shown.

What is claimed is:

1. In an electromagnetic reciprocating motor, a pair of electromagnetic structures each including a core and an armature portion mounted for restricted movement relative to said core, means for mechanically connecting said armature portions, coil means on each of said cores, one of said coil means comprising first and second coil portions, and means connecting the other one of said coil means across a source of alternating voltage in parallel with said first coil portion and in series with said second coil portion.

2. The combination of claim 1 in which said first and second coil portions are in series with each other across said source.

3. The combination of claim 1 in which said first and second coil portions are in series with each other across said source and in magnetically aiding relationship.

4. The combination of claim 1 in which said first and second coil portions are in parallel with each other with respect to said source.

5. The combination of claim 1 in which said second coil means comprises a pair of coil portions connected in series and in magnetically opposed relation with one another.

6. The combination according to claim 1, said electromagnetic structures being magnetically isolated from each other.

7. In an electromagnetic reciprocating motor, a core having a pair of oppositely disposed U-shaped core sections with a common leg, core extensions within each of said U-shaped sections, a coil assembly on each of said core extensions, each of said coil assemblies comprising a pair of coils, an armature movably mounted adjacent said core and having portions extending across the ends of said U-shaped sections, and means for supplying alternating supply current to said coil assemblies, the coils of at least one of said assemblies being so wound and connected as to induce flux in opposite directions in the core portion with which it is associated.

8. In an electromagnetic reciprocating motor, a core having a pair of oppositely disposed U-shaped core sections with a common leg, core extensions within each of said U-shaped sections, a coil assembly on each of said core extensions, each of said coil assemblies comprising a pair of coils, an armature movably mounted adjacent said core and having portions extending across the ends of said U-shaped sections, projections on each of said armature portions extending partially into their respective coil assemblies, whereby reciprocating movement of said armature will create variable air gaps between said armature projections and said core extensions, and means for supplying alternating supply current to said coil assemblies, the coils of at least one of said assemblies being so wound and connected as to induce flux in opposite directions in the core portion with which it is associated.

9. In an electromagnetic reciprocating motor, a core having a pair of oppositely disposed U-shaped core sections with a common leg, core extensions within each of said U-shaped sections, a coil assembly on each of said core extensions, each of said coil assemblies comprising a pair of coils, the coils of one of said coil assemblies being wound in series opposed relation, the coils of said other coil assembly being mounted in series aiding relation, one end of one coil in said first coil assembly being connected to the center tap between the coils of said other coil assembly, an armature movably mounted adjacent said core and having portions extending across the ends of said U-shaped sections, and means for supplying alternating supply current to said coil assemblies.

10. In an electromagnetic reciprocating motor, a core having a pair of oppositely disposed U-shaped core sections with a common leg, core extensions within each of said U-shaped sections, a coil assembly on each of said core extensions, each of said coil assemblies comprising a pair of coils, a Z-shaped armature resiliently mounted adjacent said core, said armature having a pair of outer magnetic sections adjacent the open ends of said U-shaped core sections and a non-magnetic central section, and means for supplying alternating supply current to said coil assemblies, the coils of at least one of said assemblies being so wound and connected as to induce flux in opposite directions in the core portion with which it is associated.

11. In an electromagnetic reciprocating motor, a core having a pair of oppositely disposed U-shaped core sections with a common leg, core extensions within each of said U-shaped sections, a coil assembly on each of said core extensions, each of said coil assemblies comprising a pair of coils, an armature comprising a pair of Z-shaped non-magnetic brackets disposed on opposite sides of said core, a pivotal connection between the central legs of said bracket and the common leg of said core, a pair of magnetic sections secured between the outer ends of said brackets and positioned across the open ends of said U-shaped core sections whereby said sections will be magnetically isolated from each other, and means for supplying alternating supply current to said coil assemblies, the coils of at least one of said assemblies being so wound and connected as to induce flux in opposite directions in the core portion with which it is associated.

12. The combination according to claim 11, each of said magnetic armature sections being of T-shaped construction with a projection extending partially into its corresponding coil assembly, whereby variable air gaps will be created between said armature projections and said core extensions during movement of said armature.

13. In an electromagnetic reciprocating motor, a core comprising a pair of oppositely disposed U-shaped sections having a common leg, a core extension within each of said U-shaped sections, a coil assembly on each of said core extensions, means for supplying alternating current to said coil assemblies, an armature comprising a pair of non-magnetic Z-shaped brackets disposed on opposite sides of said core, pivotal supporting means for the central legs of said brackets, and a pair of T-shaped magnetic sections secured between the outer ends of said brackets and positioned across the open ends of said U-shaped core sections, the central portions of said T-shaped armature sections projecting partially within said coil assemblies.

14. In an electromagnetic reciprocating motor, a core comprising a pair of oppositely disposed U-shaped sections having a common leg, a core extension within each of said U-shaped sections, coil assemblies on said core extensions, each of said assemblies comprising a pair of mutually inductive coils, an armature comprising a pair of non-magnetic Z-shaped brackets disposed on opposite sides of said core, a pivotal connection between the central legs of said Z-shaped brackets and the common leg of said core, said pivotal connection comprising resilient means holding said armature in an intermediate unrestrained position, a pair of T-shaped magnetic elements fixed between the outer legs of said Z-shaped brackets and disposed adjacent the open ends of said U-shaped core sections, said T-shaped elements having projections extending partially into said coil assemblies, a pair of alternating current supply conduits, means connecting the coils of one of said coil assemblies in series aiding relation across said conduits, and means connecting the coils of said other coil assembly in series opposed relation between one of said conduits and the connection between the coils of said first coils assembly.

15. In an electromagnetic reciprocating motor, a core, two coil assemblies mounted on separate portions of said core, an armature adjacent said core and having portions positioned in such manner with respect to said core as to reduce the reluctance of the core portion adjacent each coil assembly, means for supplying alternating current to said coil assemblies, and a pair of coils in one of said assemblies, said coils being so wound as to induce flux in opposite directions in the core portion on which said one coil assembly is mounted.

16. In an electromagnetic reciprocating motor, a core, two coil assemblies mounted on separate portions of said core, an armature movably mounted adjacent said core, said armature having portions so positioned with respect to said core as to reduce the reluctance of the core portion adjacent each coil assembly, a pair of mutually inductive coils comprising one of said coil assemblies, said coils being so connected and wound as to induce flux in the same direction in the core portion on which said one coil assembly is mounted, an alternating current supply line connected across said two coils, and a second pair of coils comprising the other coil assembly, one of said second pair of coils being connected to one side of the supply line, the other of said second pair of coils being connected between said first pair of coils, said second pair of coils being so connected and wound as to induce flux in opposite directions in the core portion on which said second coil assembly is mounted.

17. In an electromagnetic reciprocating motor, a core, first and second coil assemblies mounted on said core, each of said coil assemblies comprising first and second coils in mutually inductive relation, an armature movably mounted adjacent said core, said armature having portions so positioned with respect to said core as to reduce the reluctance of the core portion adjacent each coil assembly, a pair of supply conduits connected across the first coil of said first coil assembly, a connection between one end of the second coil in said first coil assembly and one of said supply conduits, a connection between the other end of said last-mentioned coil and the first coil in said second coil assembly, a connection between the two coils in said second coil assembly, and a connection between the other of said supply conduits and the second coil of said second coil assembly.

References Cited in the file of this patent
FOREIGN PATENTS 259,586    Switzerland _____ July 1, 1949